United States Patent Office 3,525,444
Patented Aug. 25, 1970

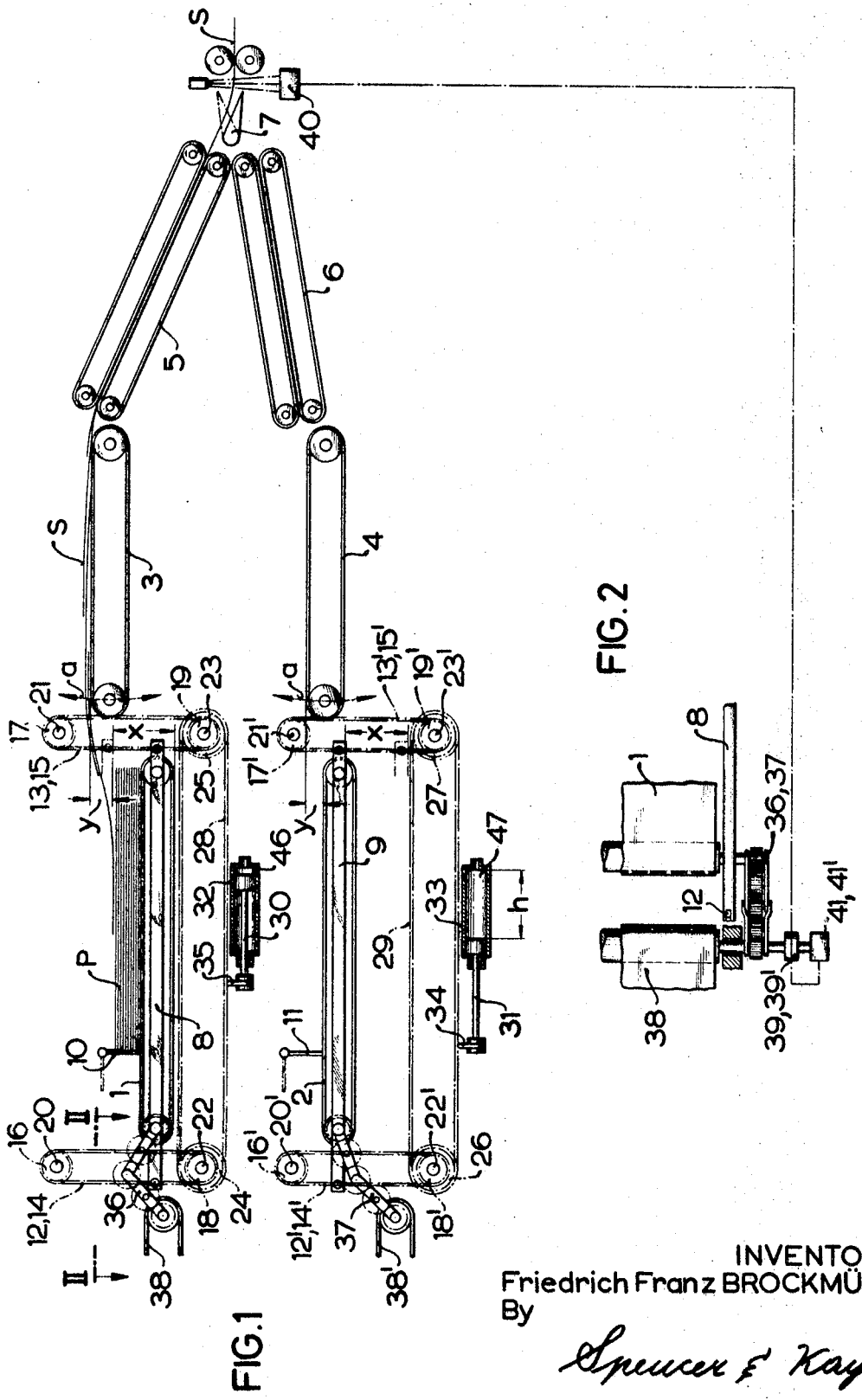

3,525,444
APPARATUS FOR FORMING PACKS
OF FLAT ARTICLES
Friedrich Franz Brockmüller, Lengerich, Westphalia,
Germany, assignor to Windmöller & Holscher, Lengerich, Westphalia, Germany
Filed Nov. 8, 1968, Ser. No. 774,343
Claims priority, application Germany, Dec. 15, 1967,
1,586,350
Int. Cl. B65g 57/14
U.S. Cl. 214—6
11 Claims

ABSTRACT OF THE DISCLOSURE

Apparatus for forming stacks of flat tube portions comprises two collecting conveyor belts and feed belts extending from a tube former to each collecting conveyor belt. Each collecting conveyor belt is mounted on a frame which can be raised or lowered by lifting gear driven by a hydraulic motor which can be operated through a metering device to lower the collecting conveyor belt during stacking of tube portions thereon by the associated feed belt at such a rate that the top of the stack remains at subsantially the same level with respect to the feed belt. After the stack is completed the motor is connected directly to a fluid reservoir to lower the conveyor belt to the level of a distributing conveyor for discharge of the completed stack, after which the motor is connected to a high pressure fluid source to raise the collector conveyor rapidly to its starting position. During discharge and raising of one collecting conveyor belt the other is loaded, so that feeding of tube portions to the collecting conveyor belts is continuous.

---

This invention relates to an apparatus for forming loose packs of any required number of flat articles, for instance tube portions produced by a tube-drawing machine for the manufacture of sacks or bags.

Having regard to the high output of tube-drawing machines used in bag making and to the correspondingly high conveying speeds of the formed tube portions, to reliably prevent the tube portions from getting dis-ordered or rolling when they are transferred to a collecting conveyor belt, to form a loose stack or pack thereon the vertical distance between the feed belt and the collecting conveyor belt must be small. However, as a result, only very small tube packs containing a relatively small number of tube portions can be formed with the necessary reliability on the collecting conveyor belt. The collecting conveyor belts must therefore be followed by conveyor and stacking devices which bring together the small packs from the collecting conveyor belts and stack them one on the other to provide large enough packs for feeding of the bottom-applying machines. These devices take up a large amount of space and are expensive.

It is an object of the invention to provide an apparatus which enables packs of any size and containing a large number of tube portions to be formed on the collecting conveyor belt itself.

According to the invention there is provided apparatus for forming loose stacks of flat articles comprising two collecting conveyor belts, drive means for the conveyor belts, feed means for feeding the articles in series to a selected one of said conveyor belts to form a stack of articles thereon with said drive means inoperative, mounting means for each conveyor belt vertically movable with respect to said feed means, a flap pivotally mounted on each mounting means and movable between a position in which it forms an abutment for the front edge of a stack on the associated conveyor belt and a position in which it is out of the path of a completed stack on the conveyor belt, motor means for each mounting means for raising and lowering said mounting means, first control means for each said motor means synchronised with said feed means for causing said motor means to lower the associated collecting conveyor belt at such a rate that the vertical position of the top of a partly completed stack on the conveyor belt with respect to said feed means is substantially constant during stacking, continuously variable adjustment means for adjusting said first control means to deal with articles of various thicknesses, second control means responsive to the number of articles passed for stacking to each conveyor belt for terminating the supply of articles to each conveyor belt when a complete stack has been formed thereon, moving the associated flap out of the path of the completed stack and operating the associated drive means to transfer the stack to further conveying means, and third control means for each conveyor belt, responsive to the completion of such transfer to cause the associated motor means to raise the conveyor belt rapidly to a position in which it can receive the first article of the next stack.

The continuously variable adjustment means is adjusted, in dependence on the thickness of the articles, so that the vertical distance between the conveying means feeding the articles to the collecting conveyor belt and the particular top article of the stack remains substantially constant when the collecting conveyor belt is lowered. The result is that when each individual tube portion is transferred to the collecting conveyor belt the same favourable spatial relations are maintained; these conditions can be adjusted once and for all at the start of operations, for instance, by raising and lowering the feed means and fixing it at the height most favourable for transference, in accordance with the properties of the particular tube portions to be stacked.

An embodiment of the invention will now be described in greater detail with reference to the drawings, wherein:

FIG. 1 is a diagrammatic side elevation of an apparatus according to the invention disposed at the end of a tube-drawing machine;

FIG. 2 is a plan view, taken along the line II—II in FIG. 1, and

Figure 3:
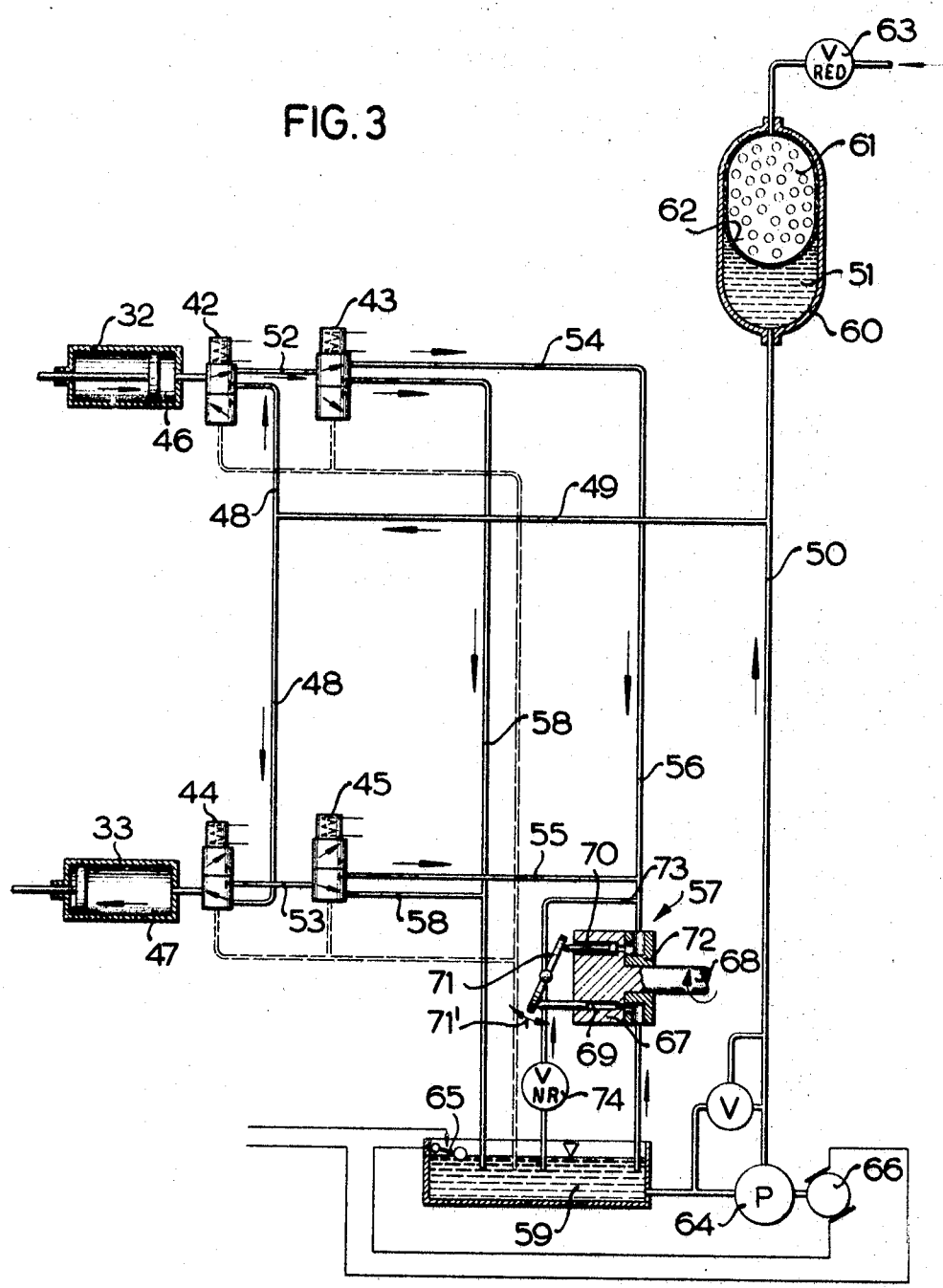
FIG. 3 is a circuit diagram of the hydraulic lifting drive of the collecting conveyor belts.

The apparatus according to the invention mainly comprises two collecting conveyor belts 1, 2 disposed at a distance one above the other, feed belts 3 and 4, distributing belts 5 and 6 and a distributing guide 7 which depending on its position, feeds a series of tube-portions S arriving from a tube-drawing machine (not shown) to the top or bottom distributing belt 5 or 6 respectively.

The collecting conveyor belts 1 and 2 are mounted in rectangular frames 8 and 9 respectively. Associated with the collecting conveyor belts 1 and 2 are stop flaps 10 and 11 respectively each extending transversely of its associated belt. The stop flaps have electric pivoting drives by means of which they can be pivoted from their vertical locking position shown in full lines in FIG. 1, into the release position shown in chain-dot lines in FIG. 1. The frames 8 and 9 are connected at their four corners to endless vertical chains 12 to 15 and 12' to 15' respectively which are guided around stationary sprocket wheels 16 to 19 and 16' to 19' respectively. The sprocket wheels are disposed in pairs on shafts 20 to 23 and 20' to 23' respectively mounted in the machine frame, the two bottom shafts 22, 23 and 22', 23' being operatively interconnected by means of the sprocket wheels 24, 25 and 26, 27 and the endless chains 28, 29. Piston rods 30 and 31 of hydraulic motors 32 and 33 respectively engage via entraining members 34 and 35 respectively with the chains 28 and 29 respectively. The rotation of the chains 28 and 29 by the motors 32 and 33 therefore causes synchronous rotations of the associated chains 12 to 15 and 12' to 15' respectively, so that the collecting conveyor belts 1, 2 attached by their frames 8, 9 to these chains are moved upwards and downwards parallel with themselves. The piston stroke $h$ determines the vertical travel $x$ of the collecting conveyor belts. As shown by the double arrows $a$, the delivery ends of the feed belts 3, 4 can be raised and lowered to adjust the distance $y$ most favourable for the transference of the tube portions S to the collecting conveyor belt, having regard to the particular properties of those tube portions, which result from the material, the number of layers thereof their dimensions and the conveying speed.

Each collecting conveyor belt 1, 2 is driven, via a train of wheels 36, 37 allowing its lifting movement, by a following storage belt 38, 38' at its conveying speed. As FIG. 2 shows, each train of wheels 36, 37 is connected to the storage belt via an electromagnetic operating clutch 39, 39' which is switched on via a time relay by a counter 40, for instance, a photo-electric counter, which counts the approaching tube portions, and is switched off by a speed monitor 41, 41'. The speed monitor 41, 41' releases the associated clutch when the belt rollers of the associated collecting conveyor belt 1, 2 have completed a predetermined number of rotations which is enough to reliably convey the tube pack P to the storage belt 38, 38'.

The upward and downward movement of the two collecting conveyor belts is performed by means of the hydraulic motors 32, 33 as shown in FIG. 3. Associated with each of the two motors 32, 33 are two electromagnetic changeover valves 42, 43 and 44, 45 respectively, of which the valves 42, 44 when in their top operating position connect the working chamber 46, 47 of the associated motor via lines 48 to 50 to a fluid accumulator 51, and when in their bottom operating position connect the working chamber 46, 47 via lines 52, 53 to the changeover valves 43, 45, which latter when in their bottom operative position connect a working chamber 46, 47 via lines 54, 56 and 55 respectively to a fluid-metering device 57 and when in their top operating position connect the working chamber 46, 47 via lines 58 directly to a storage reservoir 59.

The fluid reservoir 51 is of known construction; disposed in its pressure tank 60 is a power gas chamber 61 consisting of a resilient rubber bladder 62. The power gas chamber 61 is permanently connected via a reducing valve 63 to a compressed air source, so that a uniform pressure of, for instance, 5 atmospheres gauge is always maintained in the power gas chamber, this pressure being adequate to move the collecting conveyor belts 1, 2 reliably and rapidly upwards by means of the motors 32, 33. The accumulator 51 is charged by a pump 64 with pressurised fluid from the storage reservoir 59 as soon as a floating switch 65 in the reservoir 59 switches on the pump drive motor 66.

The fluid-metering device 57 comprises a rotating body 67 which is connected in dependence on speed via a drive shaft 68 to the drive of the tube-drawing machine. The rotary member 67 has a rim of axial cylinder bores 69 which act as measuring cylinders and in which metering pistons 70 slide. The metering pistons 70 bear under the fluid pressure in their cylinders against a disc 71 pivotable in the direction indicated by the arrow 71' which, when the rotary member 67 rotates, permits a proportionately larger movement of the metering piston the greater its inclination is; when parallel with the end surface of the rotary member 67, the disc 71 prevents any movement of the metering pistons. The disc 71 therefore enables the stroke of the metering pistons to be changed steplessly from 0 to the maximum, thereby adjusting the fluid throughput—i.e. the metered quantity of the device—to any required amount. The inlet and discharge of the fluid is controlled by a fixed control head 72 which bears tightly against an end surface of the rotary member 67 and, by means of control slits formed after the fashion of arc of a circle in this end face, controls the supply and discharge of the hydraulic fluid to the cylinder bores 69 and therefrom. To prevent the metering device 57 from running dry after the hydraulic fluid has flowed away from the working chamber 47, and when disturbances occur in the hydraulic circuit, a suction line 73 having a non-return valve 74 is connected to the discharge line 56 upstream of the metering device 57 so that if no fluid is discharged through the line 56, the metering device 57 can suck in fluid from the storage reservoir 59 via the suction line 73.

The metering device described operates volumetrically, sending through, in dependence on the adjustment of the disc 71, a quantity of fluid exactly corresponding to the adjusted swept volume of its cylinder bores 69 co-operating with the metering pistons 70 to produce metering cylinders.

The construction of the metering device described is exactly the same as that of commercially available hydraulic motors, so that the latter can readily be substituted. Of course, requirements are met even by an apparatus which comprises merely a metering cylinder and a metering piston of variable stroke. The prior art hydrodynamic metering devices can be used only on condition that the viscosity of the hydraulic fluid can be kept substantially constant by keeping its temperature constant. If a hydraulic motor with constant stroke is used, metering can also be performed by means of a steplessly regulatable transmission in the drive of the tube-drawing machine.

OPERATION

We shall assume that the number of tube portions per pack P to be formed is 100, and that the corresponding height of the packs P is 80 mm., while the total movement $x$ of the collecting conveyor belts is 120 mm., and that 25 tube portions are travelling along the belts 3, 5 and 4, 6 between the counter 40 and the collector conveyor belts 1, 2. The counter 40 has a main switch contact and a subsidiary contact, both of which are adjusted to the number 100, although the subsidiary contact operates in comparison with the main contact by a delay of the 25 tube portions travelling along the belts 3 and 5.

As shown in FIG. 1, the last of the tube portions S counted by the counter 40 is just running on to the distributing belt 5. The changeover valves 42, 43 are still in the bottom operative position shown in FIG. 3, in which they convey the hydraulic fluid discharged from the working chamber 46 of the motor 32 via lines 52, 54, 56 to the metering device 57. Consequently, the collecting conveyor belt 1 is still making a slow downward movement controlled by the metering device 57, the movement enabling a pack to be formed satisfactorily on the collecting conveyor belt 1. As soon as the hundredth tube portion has passed the counter, the main contact of the latter switches the distributing member 7 into the top position shown by chain-dot lines, so that tube portions are now supplied to the lower collecting conveyor belt 2. After the belts 6, 4 have received their full quota of 25 tube portions, and at the same time the 25 tube portions disposed on the belts 5, 3 have been supplied to the pack P on the collecting conveyor belt 1, the subsidiary contact of the counter 40 switches the stop flap 10 for the collecting conveyor belt 1, which is at that time at rest, into the release position, and switches the changeover valve 43 into its top operative position, in which the valve connects the working chamber 46 of the motor 32, via the changeover valve 42 remaining in the bottom operative position, to the storage reservoir 59 via the discharge line 58. As a result of these switching operations, after the complete pack has been formed, the collecting conveyor belt 1 is rapidly moved downwards by the difference between the height (80 mm.) of the pack P and the total travel $x=120$ mm.

of the collecting conveyor belt 1—i.e., 40 mm.—into the bottom end position, and therefore to the level of the storage belt 38. With a shorter delay, adjusted on the timing relay, the counter 40 then switches on the magnetic clutch 39 which sets the collecting conveyor belt 1 in motion by means of the train of wheels 36. As soon as the pack P has been transferred to the storage belt 38, the speed monitor 41 switches the magnetic coupling 39 off again and switches the changeover valve 42 into the top operative position, in which the valve 42 connects the working chamber 46 of the motor 32 via lines 48 to 50 to the accumulator 51, the stop flap 10 being switched into its locking position. The consequence of these switching operations is that the collecting conveyor belt 1 is stopped again and rapidly moved upwards into its stand-by position for the formation of a fresh pack.

The collecting conveyor belt 2 is disposed in the stand-by position, just described with relation to the collecting conveyor belt 1, at the moment at which the subsidiary contact of the counter 40 completes the afore-described switching operations for the collecting conveyor belt 1. As shown in FIG. 3, the two changeover valves 44, 45 aree still in the top operative position, in which the working chamber 47 of the motor is connected via lines 48 to 50 to the fluid accumulator 51. The subsidiary contact of the counter 40 then switches the changeover valves 44, 45 into their bottom operative position, in which they connect the filled working chamber 47 via the lines 53, 55, 56 to the metering device 57. This causes the collecting conveyor belt 2 to start its downward movement controlled by the metering device 57, as soon as the belt 2 has received the first tube portions via the distributing member 7 and the belts 6, 4. This controlled downward movement is terminated as soon as the subsidiary contact of the counter 40 becomes operative again, after a further 100 tube portions have passed through, the subsidiary contact then performing for the belt 2 the same switching operations and initiating the corresponding sequence thereof, as have been described in detail in relation to the belt 1. Tube portions are therefore supplied alternately to the two collecting conveyor belts 1, 2 and the tube packs formed on one belt are transferred while tube portions are being supplied to the other belt.

I claim:
1. Apparatus for forming loose stacks of flat articles comprising, two collecting conveyor belts, drive means for the conveyor belts, feed means for feeding the articles in series to a selected one of said conveyor belts to form a stack of articles thereon with said drive means inoperative, mounting means for each conveyor belt, vertically movable with respect to said feed means, a flap pivotally mounted on each mounting means and movable between a position in which it forms an abutment for the front edge of a stack on the associated conveyor belt and a position in which it is out of the path of a completed stack on the conveyor belt, motor means for each mounting means for raising and lowering said mounting means, first control means for each said motor means synchronised with said feed means for causing said motor means to lower the associated collecting conveyor belt at such a rate that the vertical position of the top of a partly completed stack on the conveyor belt with respect to said feed means is substantially constant during stacking, continuously variable adjustment means for adjusting said first control means to deal with articles of various thicknesses, second control means responsive to the number of articles passed for stacking to each conveyor belt for terminating the supply of articles to each conveyor belt when a complete stack has been formed thereon, moving the associated flap out of the path of the completed stack and operating the associated drive means to transfer the stack to further conveying means, and third control means for each conveyor belt, responsive to the completion of such transfer to cause the associated motor means to raise the conveyor belt rapidly to a position in which it can receive the first article of the next stack.

2. The apparatus of claim 1 wherein said second control means on terminating the supply of articles to one said collecting conveyor belts initiates the supply of articles to the other of said collecting conveyor belts, and is operatively connected to said first control means to cause lowering of said other conveyor belt as articles are stacked thereon.

3. The apparatus of claim 1 wherein each said motor means comprises a hydraulic motor and lifting gear operable thereby connected to the associated mounting means, the apparatus including a hydraulic fluid accumulator for pressurised hydraulic fluid and a fluid metering device forming part of said first control means, conduit means and control valve means between each hydraulic motor and said hydraulic fluid accumulator and said fluid metering means, means connecting at least said second control means with said control valve means whereby on operation of said second control means said control valve means is moved to a position in which the motor associated with said collecting conveyor belt without a stack of articles, is connected to said fluid metering devices and on operation of said third control means to raise one collecting conveyor belt said control valve means is moved to a position in which the motor associated therewith is connected to said hydraulic fluid accumulator, the first, second and third control means being so inter-related that rapid raising of one conveyor belt occurs during lowering of the other conveyor belt.

4. The apparatus of claim 3 wherein each hydraulic drive motor comprises a piston and cylinder and said fluid metering device passes fluid at a uniform volumetric rate determined by the setting of said adjustment means and the rate of operation of said feed means.

5. The apparatus of claim 4, wherein said metering device comprises at least one metering piston reciprocating in a measuring cylinder, means synchronising the rate of reciprocation of said metering piston with the rate of operation of said feed means and said adjustment means including means for adjusting the stroke of the metering piston.

6. The apparatus of claim 5 wherein said metering device comprises a rotatable body ring of axially extending cylinders, bores in the body, a plurality of cylindrical rods forming pistons in said cylinder bores and extending from one end of the body, a disc adjacent said end of the body and engaging the ends of said rods, pivot means mounting the disc for pivoting about an axis perpendicular to the rotary axis of said body to vary the stroke of the pistons formed by said rods.

7. The apparatus of claim 1 wherein said mounting means comprises a frame, and said motor means includes lifting gear comprising a plurality of endless chains each extending between a pair of vertically spaced sprocket wheels with stationary axes, said frame being fixed to said chains, and inter-connecting drive means connecting said sprocket wheels so that the frame is constrained to move vertically parallel with itself.

8. The apparatus of claim 3 including a resilient power gas chamber within said hydraulic fluid accumulator, a pressurised gas source, a reducing valve and conduit means connecting the pressurised gas source through said reducing valve to said resilient power gas chamber.

9. The apparatus of claim 3 including a hydraulic fluid reservoir and wherein said control valve means comprises for each said hydraulic motor a first and a second two-way valve, the first of which in one position connects said hydraulic fluid accumulator directly with the hydraulic motor and in the other position connects the hydraulic motor with the second two-way valve, the second two-way valve in one position connecting said first two way valve with said fluid metering device and in the other position connecting said first two-way valve with said hydraulic fluid chamber.

10. The apparatus of claim 9 including electromagnetic operating drives for moving said two-way valves between their extreme positions, said second control means comprising a counter for counting articles fed to said conveyor belts, switch means controlled by said counter and connected with said first and second two-way valves to change over the positions thereof on operation of said switch means further switch means each connected to one of said first two-way valves, operable by said means responsive to the transfer of a completed stack from the associated conveyor belt, to change over the associated first two-way valve on operation of said further switch means.

11. The apparatus of claim 1 wherein said drive means for each conveyor belt comprises a flexible train of gear wheels and an electromagnetic clutch for connecting the said train to a rotary drive member, said second control means comprising a counter and switch means controlled by the counter connected to said electromagnetic clutch to cause engagement of the latter on operation of the switch means, said means responsive to the transfer of a completed stack comprising a speed monitor connected with each collecting conveyor belt and further switch means operable by the speed monitor after a movement of the conveyor belt corresponding to such transfer and connected to said electromagnetic clutch to cause disengagement thereof on operation of said further switch means.

References Cited

UNITED STATES PATENTS

| | | |
|---|---|---|
| 2,697,388 | 12/1954 | Hansen. |
| 2,813,637 | 11/1957 | Perry. |
| 2,957,691 | 10/1960 | Williams _____ 271—88 |

GERALD M. FORLENZA, Primary Examiner

R. J. SPAR, Assistant Examiner

U.C. Cl. X.R.

93—93; 271—88